United States Patent [19]
Davis

[11] Patent Number: 4,740,949
[45] Date of Patent: Apr. 26, 1988

[54] LASER ACCESS APPARATUS FOR OPTICAL DISK DRIVE

[75] Inventor: Marvin B. Davis, Colorado Springs, Colo.

[73] Assignee: Laser Magnetic Storage International Company, Colorado Springs, Colo.

[21] Appl. No.: 39,600

[22] Filed: Apr. 16, 1987

Related U.S. Application Data

[63] Continuation of Ser. No. 766,870, Aug. 16, 1985, abandoned.

[51] Int. Cl.⁴ .......................... G11B 23/02; G11B 5/12
[52] U.S. Cl. .................................. 369/291; 360/133; 369/77.2
[58] Field of Search ...................... 369/77.2, 291, 292; 360/97, 133

[56] References Cited

U.S. PATENT DOCUMENTS

| | | | |
|---|---|---|---|
| 4,185,314 | 1/1980 | Hatchett et al. | 360/133 |
| 4,358,801 | 11/1982 | Faber et al. | 360/97 |
| 4,412,260 | 10/1983 | Stricklin et al. | 360/133 |
| 4,503,474 | 3/1985 | Nigam | 360/133 |
| 4,688,127 | 8/1987 | Oishi et al. | 369/77.2 |
| 4,688,206 | 8/1987 | Nakagawa et al. | 369/291 |
| 4,691,257 | 9/1987 | Taguchi | 369/77.2 |

FOREIGN PATENT DOCUMENTS

| | | | |
|---|---|---|---|
| 17573 | 2/1983 | Japan | 360/133 |
| 2073936 | 10/1981 | United Kingdom | 360/133 |

*Primary Examiner*—Steven L. Stephan
*Attorney, Agent, or Firm*—Sheridan, Ross & McIntosh

[57] ABSTRACT

An apparatus is disclosed for providing laser access to an optical disk enclosed in a cartridge when the cartridge is loaded into an optical drive. Two opposed panels, mounted slidably to the cartridge casing, are spring biased to close an access window in the casing. Each panel includes a detent accessible from outside of the cartridge. In the optical drive is a platform that receives and guides the cartridge as it is inserted into the drive. Two spring-loaded links are mounted relative to the platform. As the disk is inserted into the drive, the detents engage their corresponding links. Responsive to further cartridge insertion, each of the links pivots to move its associated panel to an open position against the spring biasing force.

13 Claims, 3 Drawing Sheets

LASER ACCESS APPARATUS FOR OPTICAL DISK DRIVE

This is a continuation of application Ser. No. 766,870, filed Aug. 16, 1985 now abandoned.

BACKGROUND OF THE INVENTION

This invention relates to data storage devices including optical disks enclosed in cartridges adapted for insertion into and removal from optical disk drives. The cartridge reduces disk contamination and damage during storage and handling, and further facilitates convenient yet accurate loading and removal of the disk into and out of the drive.

Typically the optical drive includes means for directing a laser beam onto the disk surface for writing and reading information. Thus it is necessary to provide an access window in the cartridge through which the laser beam can reach the disk. The access window should be closed whenever the cartridge is removed from the drive, and to achieve this end, the prior art discloses spring biased panels. When the cartridge is inserted into the drive, a probe enters the cartridge through a probe opening, contacts the panel, and moves it against the spring force to open the window. When the cartridge is removed, the panel responds to the spring force to close the window. This arrangement is shown in U.S. Pat. No. 4,412,260 to Strickin et al granted Oct. 25, 1983 showing a probe 102 entering the cartridge through a cavity 142 to open panel 144. U.S. Pat. No. 4,185,314 to Hatchett et al granted Jan. 22, 1980 discloses a slidable shutter 9 similarly responding to a pin 17. U.S. Pat. No. 4,358,801 to Faber et al granted Nov. 9, 1982 shows doors moved by pivotally mounted levers 13, pivoted when their ends 15 contact a ridge provided in the drive.

While these prior art arrangements function satisfactorily under most conditions, they require an opening in the cartridge which permits entry of dust and other foreign matter that may damage the disk. Further, these devices are structured such that the spring which biases the panel to closure also urges the cartridge away from the disk drive. This biasing, while it can be overcome by separate cartridge retaining means, can interfere with accurate cartridge positioning.

It is therefore an object of the present invention to provide a simple and reliable means for automatically opening a cartridge access window as the cartridge is loaded into a drive. It is a further object to maintain the window open while the cartridge is loaded in the drive, without thereby creating a residual spring force tending to eject the cartridge. Yet another object is to provide an apparatus for opening a cartridge access window without utilizing a drive-mounted probe and cartridge opening necessary to accommodate such probe.

SUMMARY OF THE INVENTION

To achieve these and other objects, an apparatus for providing access to a disk is disclosed. The apparatus includes a disk cartridge having a casing, and a disk inside the casing. The casing has an access window. Mounted to the casing is at least one panel, movable between an open position to allow access to the disk through the window, and a closed position to substantially prevent such access. Each panel includes a detent accessible from outside of the cartridge.

The apparatus further includes a disk drive housing including a support means for receiving and guiding the cartridge as the cartridge is inserted into the housing. A panel actuator link is associated with each panel. Each such link is mounted to the support means to move between first and second linking points. Each link, when it is at its first linking point, is positioned to releasably engage an associated detent as the cartridge is inserted. Responsive to further insertion after the link and detent engage, the link travels from its first linking point toward its second linking point, and thereby moves its associated panel from the closed position to the open position.

Preferably, a biasing means is included to urge each panel into its closed position. The biasing means can be a wire spring mounted to the casing and contacting its associated panel.

Each panel preferably includes a door, and a wing extended from the door and carrying the detent. An elongate opening can be provided in the casing, with the associated link gaining access to the detent through the opening.

The cartridge can be inserted in a longitudinal direction, with each panel moving between its open and closed positions, relative to the cartridge, in a generally transverse direction. In this event, the cartridge advantageously is provided with an elongate groove extended in the longitudinal direction for guiding the associated link toward engagement with the detent. The groove is adjacent the elongate opening, which extends in the transverse direction.

The apparatus further can include an elongate channel corresponding to each wing in which the wing is slidably mounted. Means can be provided for retaining each wing in its corresponding channel, and notches can be provided in the wing to allow removal of the wing from the channel if desired.

The panel actuator link can be pivotally mounted to the support means. At a location remote from the pivot, the link includes a column for releasably engaging the detent. When the column is employed, the link can be mounted on the opposite side of the support means from the cartridge, with the column extending toward the cartridge through an arcuate slot in the support means. A torsion spring can be used to urge the link toward its first linking point.

In one preferred application of the invention, there are two panels which contact one another when closed, and move apart in generally opposite transverse directions toward their respective open positions. Two panel actuator links, each associated with one of the panels, engage their respective detents as the cartridge is inserted.

As this invention is practiced in a disk drive, the drive includes a drive spindle contained in the housing, and a hub of the disk is adapted to drivingly engage the housing. Each of the panel actuator links is located on the support means such that the hub is substantially aligned with the spindle when each of the links is in its second linking point.

An apparatus in accordance with this invention provides direct laser access to the disk surface when the cartridge is loaded into the drive, yet protects the disk from dust or other foreign matter, and protects the operator in the event of a broken disk, when the cartridge is removed from the drive. Because each wing carries a detent accessible from outside of the cartridge, there is no need to provide a probe access cavity in the cartridge casing, eliminating the possibility of dust and other foreign matter entering such cavity. Further, with the panels traveling in the generally transverse direction, each panel actuator link can be positioned such that the panel closing spring forces act in the transverse direction when the disk is loaded. This virtually eliminates longitudinal forces tending to eject the cartridge from the drive.

IN THE DRAWINGS

These and other features and advantages of the invention will become apparent upon reading the following detailed description and upon reference to the drawings, in which.

DETAILED DESCRIPTION OF THE PREFERRED EMBODIMENT

Figure 1:
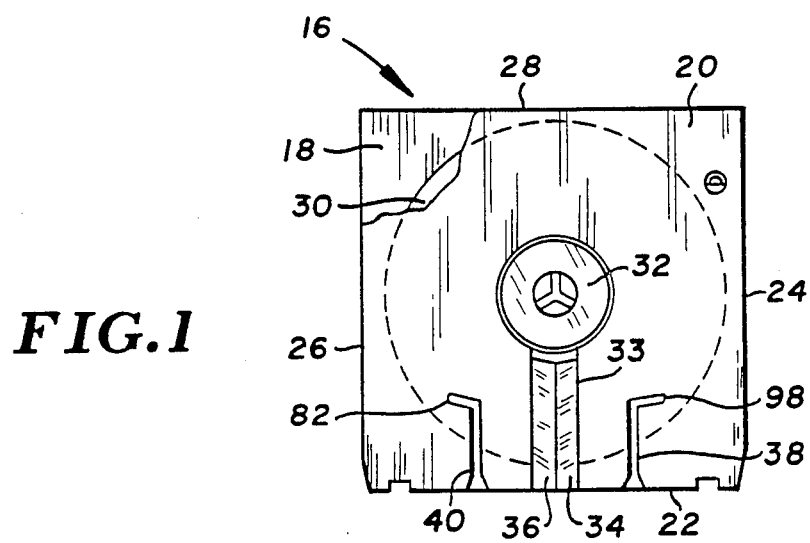
FIG. 1 is a bottom view of an optical disk cartridge constructed in accordance with the present invention.

Turning now to the drawings, there is shown in FIG. 1 an optical disk cartridge 16 including the top section 18 and a bottom section 20. The cartridge has a front edge 22 which is the leading edge as the cartridge is inserted into an optical drive. The cartridge further includes first, second and third side edges 24, 26 and 28.

Enclosed in cartridge 16 is a disk 30 which has a hub 32 adapted for driving engagement with a rotatable spindle housed in the optical drive. By rotating disk 30 with the spindle, and further by directing a laser beam to a selected radial location on the disk surface, optical information may be selectively written and read on the disk surface.

The laser beam, generated in the optical drive, reaches the disk surface through an access window 33 in bottom section 20. When cartridge 16 is not loaded into the drive, first and second panels 34 and 36 keep the access window closed. As cartridge 16 is loaded into the optical drive, panel actuator links move relative to the cartridge in first and second tracks 38 and 40 in the bottom section, engage the panels, and open them during the remainder of insertion.

Figure 2:
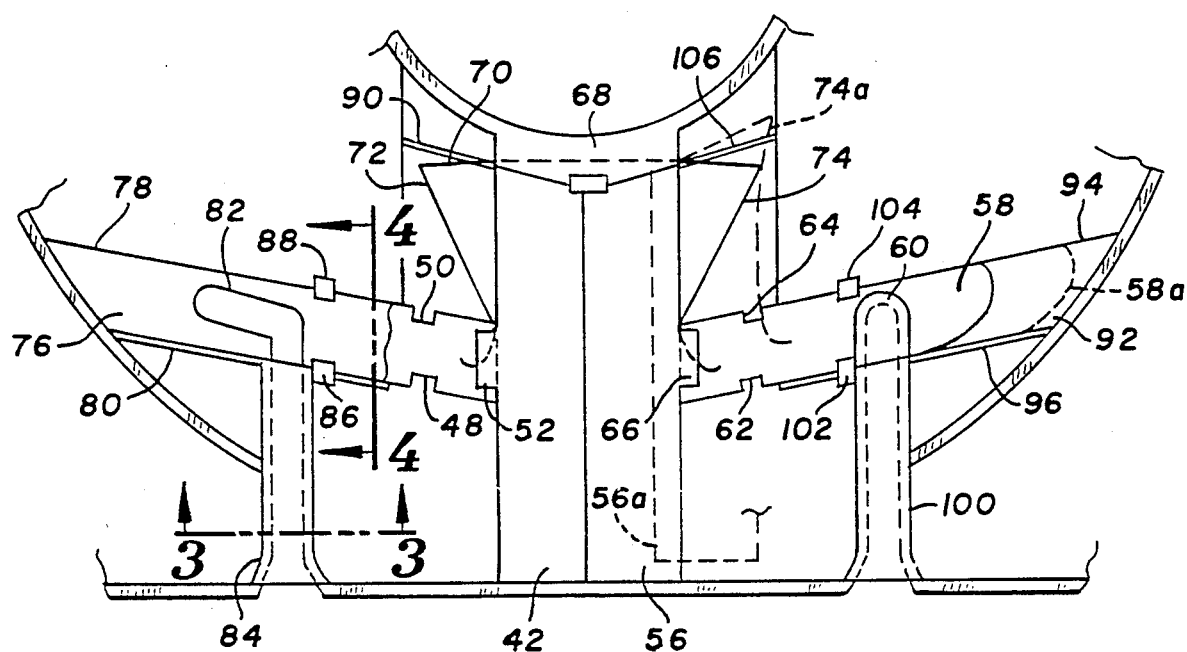
FIG. 2 is a top view of a bottom section of the cartridge.

FIG. 2 shows part of the inside of bottom section 20, revealing the panels and their cooperating structure in greater detail. First panel 34 includes an elongate first door 42 oriented in a longitudinal direction. A first wing 44 extends generally transversally, but slightly inclined from the normal with respect to door 42. Mounted to wing 44 (see FIG. 5) is a U-shaped first detent 46. First forward and rearward notches 48 and 50 are formed in opposite sides of the wing. Finally, panel 34 includes a first bracket 52 extended outwardly from door 42.

Second panel 36 is substantially identical to first panel 34, and includes a second door 56 from which extends a second wing 58 in a generally transverse direction. Second wing 58 includes a second detent 60, and has second forward and rearward notches 62 and 64 formed in its opposite sides. A second bracket 66 extends outwardly from door 56.

Mounted in a collar 68 of bottom section 20 is a wire spring 70. A first spring section 72 of spring 70 extends to door 42 and is held between wing 44 and bracket 52. Similarly, a second spring section 74 of the spring extends to second door 56 and is maintained between bracket 66 and wing 58. Spring sections 72 and 74 continually bias their associated panels toward the closed position.

Figure 3:
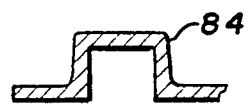
FIG. 3 is a sectional view taken along the line 3—3 in FIG. 2.
Figure 4:
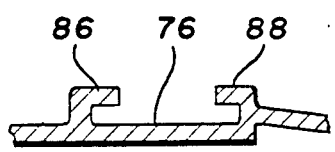
FIG. 4 is a sectional view taken along the line 4—4 in FIG. 2.

For guiding reciprocal motion of first panel 34, a first channel 76 is formed in bottom section 20 between a first channel wall 78 and a first channel rib 80. A portion of first wing 44 is broken away to reveal the bottom of the channel, in which is formed a first inclined slot 82. A first groove 84 (see FIG. 3) is formed in the bottom section and extends in the longitudinal direction. Inclined slot 82 and groove 84 combine to form first track 38.

Opposed first forward and first rearward retainers 86 and 88 are provided at the first channel rib and wall, respectively. They cooperate to form an opening slightly wider than the thickness of first wing 44, thus to restrict the wing to sliding movement within first channel 76. Sufficient outward travel of wing 44 aligns notches 48 and 50 with retainers 86 and 88, to ease assembly and permit removal of panel 34 if desired. Also serving to confine movement of first panel 34 is a first door guide rib 90.

Second panel 54 similarly is confined to reciprocal sliding movement by a second channel 92 having a second channel wall 94 and a second channel rib 96. A second inclined slot 98 (FIG. 1) and a second groove 100 combine to form second track 40. Opposed second forward and rearward retainers 102 and 104 maintain second wing 58 in the second channel. The movement of second panel 54 also is guided by a second door guide rib 106.

Doors 42 and 56 are opened by sliding them in substantially opposite directions against the force of spring 70. Broken lines at 56a show the position of the inner edge of second door 56 when the door is opened. Second spring section 74 is represented in broken lines at 74a to show its elastic deformation in response to the opening of the door. Further broken lines at 58a illustrate the open position for the outer edge of second wing 58.

Figure 5:
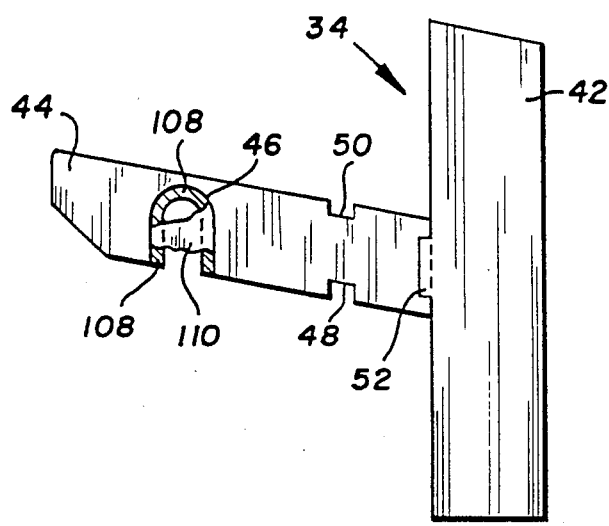
FIG. 5 is a top view showing a panel of the cartridge.
Figure 6:
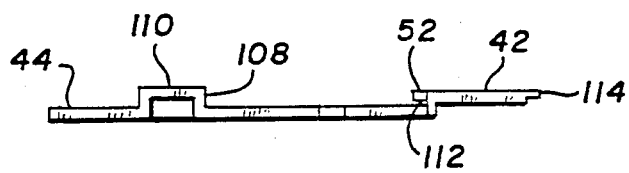
FIG. 6 is a side view of the panel.

FIGS. 5 and 6 show first panel 34 removed from cartridge 16. First detent 46 includes a U-shaped detent wall 108 extended upwardly from wing 44, and a detent top 110. Detent 46 is open in the forward direction and at the bottom, and is adapted to releasably engage a panel actuator link mounted in the optical drive, as is later explained. Second panel 54 is substantially identical to the first panel.

FIG. 6 also shows a spring retaining cavity 112 between first bracket 52 and wing 44 where the outward end of first spring section 72 is retained. An upper ledge 114 of first door 42 and a corresponding lower ledge of second door 56 (not shown) permit the doors to dovetail when closed.

Figure 7:
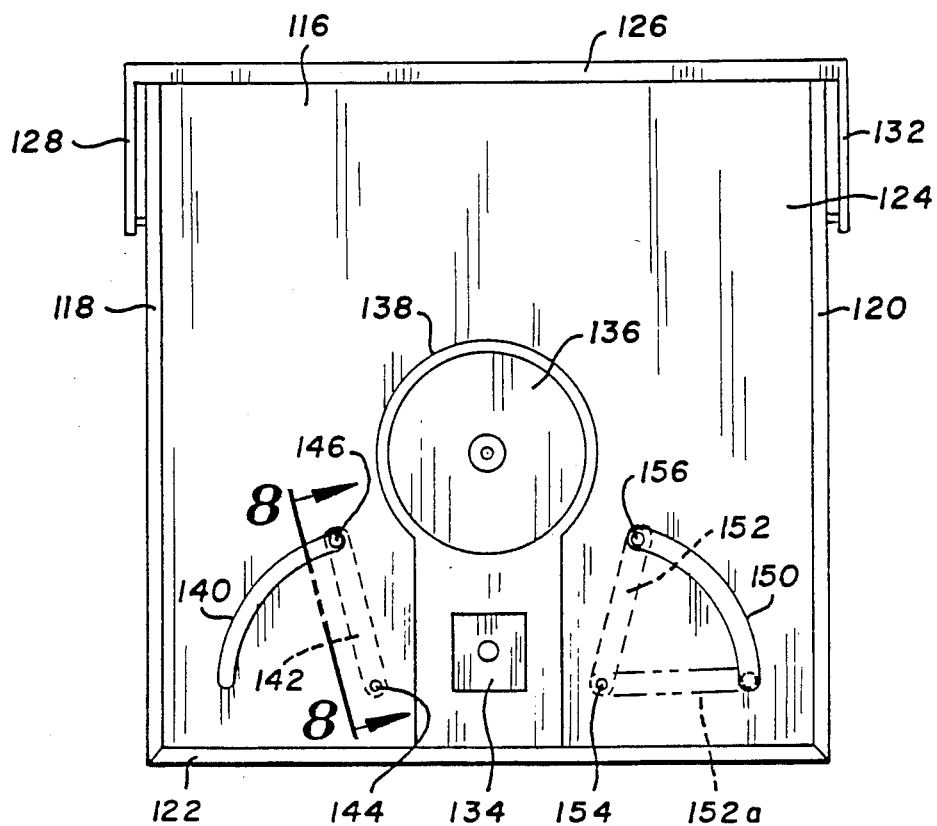
FIG. 7 is a top view of an optical drive constructed in accordance with the present invention.

FIG. 7 shows in top plan view an optical disk drive 116 into which cartridge 16 may be inserted for operation. Drive 116 has a housing including first, second and third side walls 118, 120 and 122. The housing also includes a support means or platform 124 which receives the cartridge and guides it as it is loaded into the housing. Alternatively, the support means can be two cartridge guides on opposite sides of drive 116. Not shown is a top wall, parallel and spaced apart from platform 124. Cartridge 16 is loaded into drive 116 through an opening normally closed by a drive door 126. The drive door is mounted to the housing through a first arm 128 pivoted to first side wall 118 and a second arm 132 pivoted to second side wall 120.

Drive 116 includes a rotatable spindle 136 which engages hub 32 through an aperture 138 in the platform when the cartridge is loaded in the drive. The drive further includes a laser source 134 which directs a laser beam through aperture 138, through access window 33 and onto the surface of disk 30.

Figure 8:
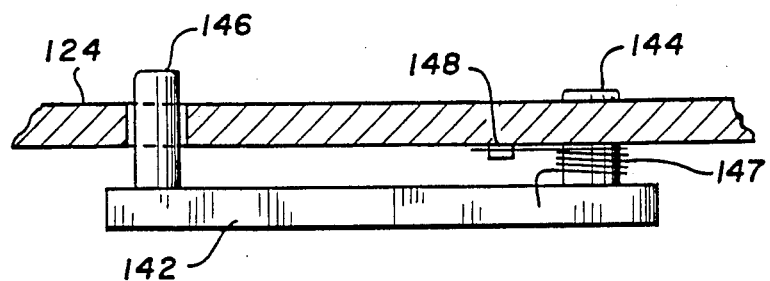
FIG. 8 is a sectional view taken along the line 8—8 in FIG. 7.

Drive 116 has a door opening mechanism for allowing laser beam passage through window 33. A first arcuate track or slot 140 is formed in platform 124 between spindle 136 and third side wall 122. Also between the spindle and side wall 122 is a first panel actuator link 142, mounted pivotally with respect to platform 124 at a first pivot 144. A first column 146, mounted to the end of link 142 remote from pivot 144, travels in slot 140 between first and second linking points as the link pivots. Link 142 is continually biased clockwise as viewed in the figure; i.e., away from its second linking point and toward its first linking point. The biasing means is a torsion spring 147 (FIG. 8), having one end bearing against first link 142 and its other end bearing against a tab 148 projected from platform 124.

Opposite first slot 140 is a second arcuate track or slot 150. A second panel actuator link 152 is attached to platform 124 at a second pivot 154 for pivotal movement with respect to the platform. A second column 156, extending upwardly through slot 150 above the platform, is moved between first and second linking points as second link 152 pivots. The first linking point for link 152 is shown in broken lines at 152, with the second linking point at 152a. The first and second linking points of link 142 are opposed to, but have substantially identical longitudinal locations as, those of link 152. Link 152, like link 142, is biased toward its first linking point by a torsion spring. When the support means includes the opposed cartridge guides, one of links 142 and 152 is mounted to each guide.

Figure 9:
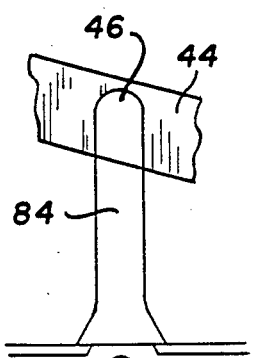
FIGS. 9-11 are schematic views illustrating operation of panel opening apparatus in the drive as the cartridge is inserted into the drive.
Figure 10:
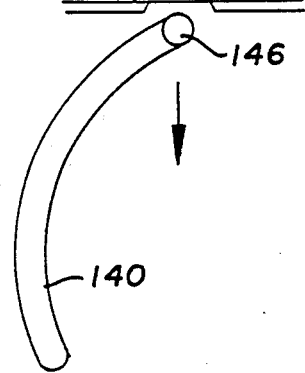
Figure 11:
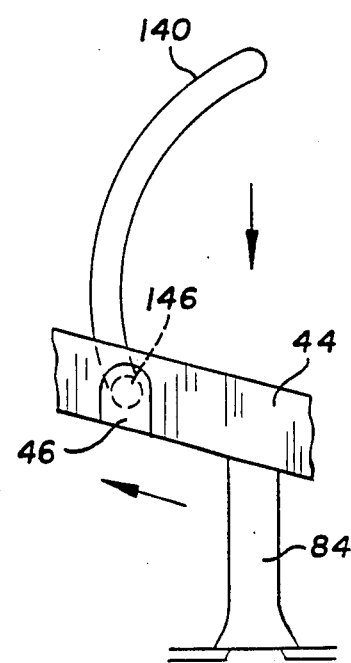

FIGS. 9-11 schematically illustrate the operation of the door opening mechanism. While only first column 146 and portions of first panel 34 are shown, it should be recognized that columns 146 and 156, and panels 42 and 54, move in concert as cartridge 16 is loaded into drive 116.

Cartridge 16 is inserted linearly, in the longitudinal direction. FIG. 9 depicts column 146 with link 142 at its first linking point. The column is substantially aligned with first groove 84 as cartridge 16 is inserted in the direction of the arrow. Second groove 100 and second column 156 are similarly aligned. A widened forward portion of groove 84 ensures that first column 146 will be captured in the groove as the cartridge is inserted.

Continued loading of cartridge 16 eventually moves first detent 46 into releasable engagement with first column 146 as shown in FIG. 10. Simultaneously, second column 156 and second detent 60 become engaged. The cartridge is not yet fully loaded, and from the figure is it seen that any further insertion of cartridge 16 in the direction of the arrow requires movement of first detent 46 and first column 146.

Travel from the position shown in FIG. 10 to that shown in FIG. 11 involves a combination of movements: first, detent 46 acts upon first column 146 causing first link 142 to pivot, thus causing the first column to trace an arcuate path in slot 140; also, first column 146, as it travels, forces detent 46 downward and to the left as viewed in FIG. 11. With respect to cartridge 16, detent 46 moves in the direction of the inclined arrow in FIG. 11. In similar fashion, second column 156 is moved by second detent 60, and in turn moves the second detent. While first column 146 in FIG. 11 abuts the lower end of first slot 140 in its second linking point, such point need be only proximate the lower end.

When the cartridge is loaded, hub 32 preferably is substantially aligned for engagement with spindle 136. Following cartridge insertion, platform 124 then is lowered to lower cartridge 16, bringing hub 32 into engagement with the spindle.

The door opening mechanism enhances the hub/spindle alignment, in that it minimizes the residual forces tending to eject cartridge 16 immediately after loading. The panel-closing force of first spring section 72 acts in a direction opposite to that of the inclined arrow shown in FIG. 11. The orientation of arcuate slot 140 is such that the force of first spring section 72 actually tends to maintain first column 146 at its second linking point, countering the tendency for cartridge 16 to eject. While the force of torsion spring 147 on first link 142, and the force of the opposed coil spring on second link 152 tend to eject the cartridge, these forces are readily overcome by wire spring 70 and the weight of cartridge 16.

During removal of cartridge 16 from drive 116, the door opening mechanism ensures that panels 34 and 54 are returned to the closed position, as can be understood in considering FIGS. 9-11 in reverse sequence.

With first column 146 at its second linking point, drive door 126 is opened, activating a cartridge eject mechanism not described herein. A suitable eject mechanism is shown in co-pending U.S. application Ser. No. 765,426, filed by the assignee of this application. The eject mechanism overcomes the retaining force from wire spring 70, allowing first column 146 to move toward its first linking point as first link 142 pivots in response to the force of torsion spring 147. Such column movement permits first detent 46 to move inward; i.e., in the direction opposite the inclined arrow in FIG. 11 with respect to cartridge 16. When first column 146 reaches the first linking point, cartridge 16 remains partially inserted in drive 116, yet first panel 34 is closed. Second panel 54 also is closed, having been moved by second link 152 in the same manner. Cartridge 16 is then withdrawn from the drive.

The mechanism just described ensures that the panels are open before the complete loading of the cartridge, to avoid interference with the drive optics and possible damage to the lens. The mechanism also ensures that the panels are closed whenever the cartridge is removed from the optical drive. This prevents injury to the disk from dust and other foreign matter, and protects the operator in the event of a broken disk. The U-shaped detents and their associated columns avoid the need for an opening in the cartridge for a drive-mounted probe, reducing the chance for entry of contaminants into the cartridge when removed from the drive. Finally, the use of drive-mounted springs for biasing the links, and a separate, cartridge-mounted spring for urging the panels to the closed positions, permit a geometry which directs the panel closing spring force in a direction substantially normal to the direction of disk insertion. Consequently, the same spring force that tends to close the panels can be used, when the cartridge is fully loaded, to keep the cartridge loaded and the panels open.

What is claimed is:

1. Apparatus useful in covering and uncovering an access window in a disk cartridge in cooperation with a disk drive, the disk drive including a link actuator and a cartridge-receiving receptacle, the apparatus comprising:

a disk cartridge having a casing and a disk inside the casing, said disk cartridge being linearly insertable in a longitudinal direction into the cartridge-receiving receptacle of the disk drive, said casing having a longitudinal surface and a lateral surface, said longitudinal surface being of a greater size than said lateral surface, said disk cartridge further having means defining an access window located substantially in said longitudinal surface of said casing;

channel means within said casing forming a track generally transverse to said longitudinal direction, slot means extending along said track and through said casing, and groove means in said casing extending longitudinally from said lateral surface to said slot means, said groove means being formed in said longitudinal surface;

panel means comprising a door and a wing attached to said door, said door for covering said access window and having a length in said longitudinal direction greater than the length of said wing in said longitudinal direction, said wing mounted to said channel means for movement along said track to effect movement of said door between an open position to allow access to said disk through said access window and a closed position to substantially prevent such access, said panel means having detent means open to said slot means to permit engagement thereof by the link actuator to move said door between its closed position and its open position, said detent means being open to said groove means when said door is in its closed position; said door positioned substantially outside said track when said door is in its open position; wherein the link actuator in the disk drive travels along said groove means to engage said detent means during longitudinal insertion of said disk cartridge into the cartridge-receiving receptacle of the disk drive, and continued longitudinal insertion movement of said disk cartridge into the cartridge-receiving receptacle causes said actuator to move generally transverse along said track to move said door from the closed position to the open position.

2. Apparatus according to claim 1 further including bias means associated with said panel means for urging the panel means to the closed position.

3. Apparatus according to claim 1 wherein said panel means comprises a pair of doors, a wing attached to each said door and extending generally transverse thereto, said channel means comprising a pair of channels each forming a generally transverse track in which a respective wing tracks, said slot means comprising a slot along each said track through said casing and said groove means comprising a pair of grooves each extending between a front edge of said casing and one of said slots, said detent means comprising a detent on each wing.

4. Apparatus according to claim 3 further including bias means associated with said panel means for urging the panel means to the closed position.

5. Apparatus according to claim 4 wherein said bias means comprises a wire spring mounted to said casing and contacting each of said doors.

6. Apparatus for providing access to a disk comprising, in combination:

a disk drive having a cartridge-receiving receptacle within which a disk cartridge is inserted in a generally longitudinal direction, support means pivotally supporting a link actuator in said receptable and first biasing means for urging said link actuator in a direction toward a first position; and a disk cartridge having a casing, a disk inside the casing, means defining an access window in said casing, channel means within said casing forming a track generally transverse to said longitudinal direction, slot means extending along said track and through said casing, groove means in said casing extending longitudinally from an edge of said casing to said slot, and panel means mounted to said channel means for movement along said track between an open position to allow access to said disk through said access window and a closed position to substantially prevent such access, said panel means having detent means open to said slot means to permit engagement thereof by said link actuator to move said panel means between its closed position and its open position, said detent means being open to said groove means when said panel means is in its closed position, said disk cartridge further having second biasing means associated with said panel means for urging said panel means in a direction toward the closed position;

whereby, said link actuator travels along said groove means to engage said detent means during longitudinal insertion of said disk cartridge into the cartridge-receiving receptacle of the disk drive, and continued longitudinal insertion movement of said disk cartridge into the cartridge-receiving receptacle causes said link actuator to pivot away from said first position and move generally transverse along said track to move said panel means from the closed position to the open position, the direction of said transverse movement having a component opposite to said direction of urging of said first biasing means and said direction of said transverse movement having a component opposite to said direction of urging of said second biasing means during at least a first portion of said transverse movement.

7. Apparatus according to claim 6 wherein said direction of transverse movement has a component opposite to the direction of urging of said second biasing means associated with said panel means for urging the panel means to the closed position and said direction of transverse movement has a component in said direction of urging of said first biasing means, during a second portion of said transverse movement.

8. Apparatus according to claim 6 wherein said panel means comprises a pair of doors, a wing attached to each said door and extending generally transverse thereto, said channel means comprising a pair of channels each forming a generally transverse track, said slot means comprising a slot along each said track through said casing and said groove means comprising a pair of grooves each extending between a front edge of said casing and one of said slots, said detent means comprising a detent on each wing.

9. Apparatus according to claim 8 further including bias means associated with said panel means for urging the panel means to the closed position.

10. Apparatus according to claim 9 wherein said bias means comprises a wire spring mounted to said casing and contracting each of said doors.

11. Apparatus for providing access to a disk comprising, in combination:
a disk drive having a cartridge-receiving receptacle within which a disk cartridge is inserted in a generally longitudinal direction, support means pivotally supporting a link actuator in said receptacle;
a disk cartridge having a casing, a disk inside the casing, means defining an access window in said casing, channel means within said casing forming a track generally transverse to said longitudinal direction, slot means extending along said track and through said casing, groove means in said casing extending longitudinally from an edge of said casing to said slot, and panel means mounted to said channel means for movement along said track between an open position to allow access to said disk through said window and a closed position to substantially prevent such access, said panel means having detent means open to said slot means to permit engagement thereof by said link actuator to move said panel means between its closed position and its open position, said detent means being open to said groove means when said panel means is in its closed position; and
an arcuate slot formed in said support means, said link actuator includes a column extending toward said cartridge through said arcuate slot, whereby the column extends through said groove means to engage the detent means during insertion of said disk cartridge into said cartridge-receiving receptacle and said link actuator pivots so that said column tracks arcuately in said arcuate slot while tracking transversely along said slot during continued insertion of said disk cartridge; and whereby said link actuator travels along said groove means to engage said detent means during longitudinal insertion of said disk cartridge into the cartridge-receiving receptacle of the disk drive, and continued longitudinal insertion movement of said disk cartridge into the cartridge-receiving receptacle causes said link actuator to pivot and move generally transverse along said track to move said panel means from the closed position to the open position.

12. Apparatus for providing access to a disk comprising, in combination:
a disk drive having a cartridge-receiving receptacle within which a disk cartridge is inserted in a generally longitudinal direction, support means pivotally supporting a link actuator in said receptacle; and
a disk cartridge having a casing, a disk inside the casing, means defining an access window in each casing, channel means within said casing forming a track generally transverse to said longitudinal direction, slot means extending along said track and through said casing, groove means in said casing extending longitudinally from an edge of said casing to said slot, and panel means mounted to said channel means for movement along said track between an open position to allow access to said disk through said window and a closed position to substantially prevent such access, said panel means having detent means open to said slot means to permit engagement thereof by said link actuator to move said panel means between its closed position and its open position, said detent means being open to said groove means when said panel means is in its closed position;
said panel means comprises a pair of doors, a wing attached to each said door and extending generally transverse thereto, said channel means comprising a pair of channels each forming a generally transverse track, said slot means comprising a slot along each said track through said casing and said groove means comprising a pair of grooves each extending between a front edge of said casing and one of said slots, said detent means comprising a detent on each wing; and
an arcuate slot formed in said support means, said link actuator includes a column extending toward said cartridge through said arcuate slot, whereby the column extends through said groove means to engage the detent means during insertion of said disk cartridge into said cartridge-receiving receptacle and said link actuator pivots so that said column tracks arcuately in said arcuate slot while tracking transversely along said slot during continued insertion of said disk cartridge; and whereby said link actuator travels along said groove means to engage said detent means during longitudinal insertion of said disk cartridge into the cartridge-receiving receptacle of the disk drive, and continued longitudinal insertion movement of said disk cartridge into the cartridge-receiving receptacle causes said link actuator to pivot and move generally transverse along said track to move said panel means from the closed position to the open position.

13. Apparatus useful in covering and uncovering an access window in a disk cartridge in cooperation with a disk drive, the disk drive including a link actuator, the apparatus comprising:
a disk cartridge having a casing defining a chamber, a disk inside said chamber, and means defining an access window in said casing;
channel means within said casing forming a track, slot means extending along said track and through said casing, and groove means formed in a major surface of said casing and extending longitudially from an edge of said casing to said slot means;
panel means comprising a door and a wing attached to said door, said door for covering said access window and said wing mounted to said channel means for movement along said track to effect movement of said door between an open position to allow access to said disk through said access window and a closed position to substantially prevent such access, said panel means having detent means open to said slot means to permit engagement thereof by the link actuator to move said door between its closed position and its opened position, said detent means being open to said groove means when said door is in its closed position, said wing substantially covering said slot means when said door is in its closed position, wherein at least a portion of said wing lies between said link actuator and said chamber to substantially prevent penetration of said link actuator into said chamber, and wherein the link actuator in the disk drive travels along said groove means to engage said detent means during longitudinal insertion of said disk cartridge into the cartridge-receiving receptable of the disk drive, and continued longitudinal insertion movement of said disk cartridge into the cartridge-receiving receptacle causes said actuator to move generally transverse along said track to move said door from the closed position to the open position.

* * * * *